(12) United States Patent
Sims

(10) Patent No.: US 8,250,378 B1
(45) Date of Patent: Aug. 21, 2012

(54) SYSTEM AND METHOD FOR ENABLING ENCRYPTION

(75) Inventor: Robert C. Sims, Round Rock, TX (US)

(73) Assignee: Crossroads Systems, Inc., Austin, TX (US)

( * ) Notice: Subject to any disclaimer, the term of this patent is extended or adjusted under 35 U.S.C. 154(b) by 753 days.

(21) Appl. No.: 12/025,181

(22) Filed: Feb. 4, 2008

(51) Int. Cl.
*G06F 21/00* (2006.01)

(52) U.S. Cl. ......... 713/193; 713/189; 713/191; 725/25; 380/201; 380/277

(58) Field of Classification Search .................. 713/153, 713/189, 171, 191; 380/201, 277, 61; 725/25; 709/204
See application file for complete search history.

(56) References Cited

U.S. PATENT DOCUMENTS

| | | | |
|---|---|---|---|
| 523,943 | A | 8/1993 | Hoge et al. |
| 5,268,802 | A | 12/1993 | Bar |
| 565,106 | A | 7/1997 | Newell |
| 6,212,606 | B1 | 4/2001 | Dimitroff |
| 6,658,526 | B2 | 12/2003 | Nguyen et al. |
| 6,732,010 | B1 * | 5/2004 | Ochs et al. ............ 700/214 |
| 6,968,459 | B1 | 11/2005 | Morgan et al. |
| 7,000,085 | B2 | 2/2006 | Camble et al. |
| 7,003,674 | B1 | 2/2006 | Hamlin |
| 7,042,720 | B1 | 5/2006 | Konshak et al. |
| 7,139,147 | B2 | 11/2006 | Yasue et al. |
| 7,155,609 | B2 * | 12/2006 | Chan et al. ............ 713/171 |
| 7,162,496 | B2 | 1/2007 | Amarendran et al. |
| 2002/0004883 | A1 | 1/2002 | Nguyen et al. |
| 2002/0188856 | A1 | 12/2002 | Worby |
| 2003/0074319 | A1 | 4/2003 | Jaquette |
| 2003/0126225 | A1 * | 7/2003 | Camble et al. ............ 709/215 |
| 2004/0078334 | A1 | 4/2004 | Malcolm et al. |
| 2004/0103292 | A1 | 5/2004 | Shirouzu |
| 2004/0172550 | A1 | 9/2004 | Sai |
| 2005/0071591 | A1 | 3/2005 | Goodman et al. |
| 2005/0213440 | A1 | 9/2005 | Goodman et al. |
| 2005/0262361 | A1 | 11/2005 | Thibadeau |
| 2006/0013078 | A1 | 1/2006 | Goodman et al. |
| 2006/0085636 | A1 | 4/2006 | Osaki |
| 2006/0195704 | A1 | 8/2006 | Cochran et al. |

(Continued)

FOREIGN PATENT DOCUMENTS

WO WO 2003/049361 6/2003

(Continued)

OTHER PUBLICATIONS

International Search Report and Written Opinion for PCT Application No. PCT/US2009/042714, completed Oct. 26, 2009, mailed Oct. 30, 2009, 12 pgs.

(Continued)

*Primary Examiner* — Carl Colin
*Assistant Examiner* — Ali Shayanfar
(74) *Attorney, Agent, or Firm* — Sprinkle IP Law Group

(57) ABSTRACT

Embodiments provide systems and methods for the encryption of data to be stored on media in a library. A method of data encryption may comprise intercepting or monitoring commands sent to a library comprising one or more media stored at secure slots. If in response to a command or commands, media is moved from a secure slot to a drive, data stored on the media by the drive is encrypted, either by an encryption device, the drive or other encryption system, thus allowing encryption based on individual slots or media in a library.

22 Claims, 4 Drawing Sheets

U.S. PATENT DOCUMENTS

| | | | |
|---|---|---|---|
| 2006/0215305 A1 | 9/2006 | Yasue et al. | |
| 2006/0224852 A1 | 10/2006 | Kottomtharayil et al. | |
| 2007/0043958 A1 | 2/2007 | Sasaki | |
| 2007/0106840 A1* | 5/2007 | Estelle et al. | 711/111 |
| 2007/0206792 A1* | 9/2007 | Saito | 380/201 |
| 2007/0294753 A1 | 12/2007 | Tanaka et al. | |
| 2008/0065903 A1* | 3/2008 | Goodman et al. | 713/193 |
| 2008/0250204 A1 | 10/2008 | Kavuri et al. | |

FOREIGN PATENT DOCUMENTS

| | | |
|---|---|---|
| WO | WO 2006/098009 A1 | 9/2006 |

OTHER PUBLICATIONS

International Preliminary Report on Patentability for PCT Application No. PCT/US2009/042714, issued Nov. 9, 2010, mailed Nov. 18, 2010, 8 pgs.

Office Action for U.S. Appl. No. 12/115,218, mailed May 4, 2011, 27 pgs.

Office Action for U.S. Appl. No. 12/115,218, mailed Oct. 25, 2011, 29 pgs.

* cited by examiner

SYSTEM AND METHOD FOR ENABLING ENCRYPTION

TECHNICAL FIELD OF THE INVENTION

This disclosure describes various methods and systems for enabling encryption. More particularly, embodiments include methods and systems for storing encrypted data on cartridges or other media.

BACKGROUND

Data represents a significant asset for many entities. Consequently, securing stored data against theft and/or data loss, whether accidental or caused by malicious activity is enormously important. Failure to do so can be costly in terms of wasted manpower, loss of goodwill from customers, loss of time and/or potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage such as, for example, multiple magnetic tapes. Centralized data backup has the advantage of increased volume, efficiency and redundancy.

In many systems, the data to be backed up and backup commands are sent over a network from multiple machines on the network to a library. One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Libraries can contain private or sensitive data. Consequently, it may be desired to keep data confidential and prevent unauthorized persons or machines from accessing data stored in a library. For example, because cartridges are portable and may be removed from a tape library, it may be desirable to prevent data in a library from being accessed by unauthorized users or machines in the event tape cartridges are stolen or inappropriately accessed over a network by an unauthorized user. To this end, data to be stored in a library may be encrypted to prevent unauthorized users or machines from accessing the data.

SUMMARY

Embodiments provide systems and methods for enabling encryption of data stored at a library. In one embodiment, a method for enabling encryption is discussed that may include intercepting one or more commands sent over a network to a media library, parsing the one or more commands to determine a first media moved to a drive from a secure slot and encrypting data stored on the first media. More particularly, commands to a media changer may be intercepted such that it can be determined if media is moved from a secure slot to a drive and the drive the media is moved to. Slots may be designated as secure slots in an encryption policy which lists one or more secure slots and the element number or other identification of the secure slots.

Embodiments of methods and systems for enabling the encryption of data or the storage of encrypted data in media at a library can include a system comprising a controller and a set of computer instructions executable by the controller to implement the above-described method. Additional embodiments can comprise an encryption appliance for implementing the above-described method. Other embodiments may include a software product comprising computer instructions executable to implement the above-described method. In a further embodiment, computer readable media may contain computer instructions operable to implement the above-described method.

Embodiments of methods and systems described above allow individual slots in a library to be secure slots such that the data stored on cartridges stored at secure slots is encrypted. Thus, individual cartridges or other media in a library may store encrypted data based on an associated slot, allowing for greater flexibility in the secure storage of data: instead of data being encrypted based on the drive to which the data is destined or the host from which the data came, data directed to a cartridge or other media stored at a secure slot may be encrypted. Thus, a drive in a library may be used for both encryption and non-encryption purposes or functions. For example, a drive may be leveraged for multi-use as opposed to being limited to perform only encryption functions. This enables the sharing of drives or other physical storage devices in a library such that an individual drive may write both encrypted and non-encrypted data to storage media in a library. Because a drive can be used to perform both encryption and non-encryption functions, users can utilize individual drives or physical storage devices as necessary or desired for encryption or non-encryption, thus allowing device resources to be better utilized.

BRIEF DESCRIPTION OF THE FIGURES

A more complete understanding of embodiments of systems and methods and the advantages thereof may be acquired by referring to the following description, taken in conjunction with the accompanying drawings in which like reference numbers indicate like features and wherein.

DETAILED DESCRIPTION

Preferred embodiments are illustrated in the FIGURES, like numerals being used to refer to like and corresponding parts of the various drawings.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

This disclosure describes various systems and methods for enabling the encryption of data or storing encrypted data on storage media at a storage media system such as a tape library, optical jukebox or other storage media system comprising drives and slots or equivalents. This disclosure will describe tape library embodiments, but is applicable to any storage media system comprising drives and slots or equivalents. Data stored at a library may be encrypted based upon slots in the library such that cartridges or other media stored at specified slots will have encrypted data stored on them. In particular, in one example, slots in a library may be designated as secure slots and cartridges stored at the secure slots may be secure cartridges. Data to be stored on secure cartridges may be encrypted such that secure cartridges contain encrypted data while non-secure cartridges (i.e. cartridges not stored in secure slots) contain unencrypted data. In a further embodiment, slots in a library may be designated as secure or unsecure in accordance with one or more policies.

Figure 1:
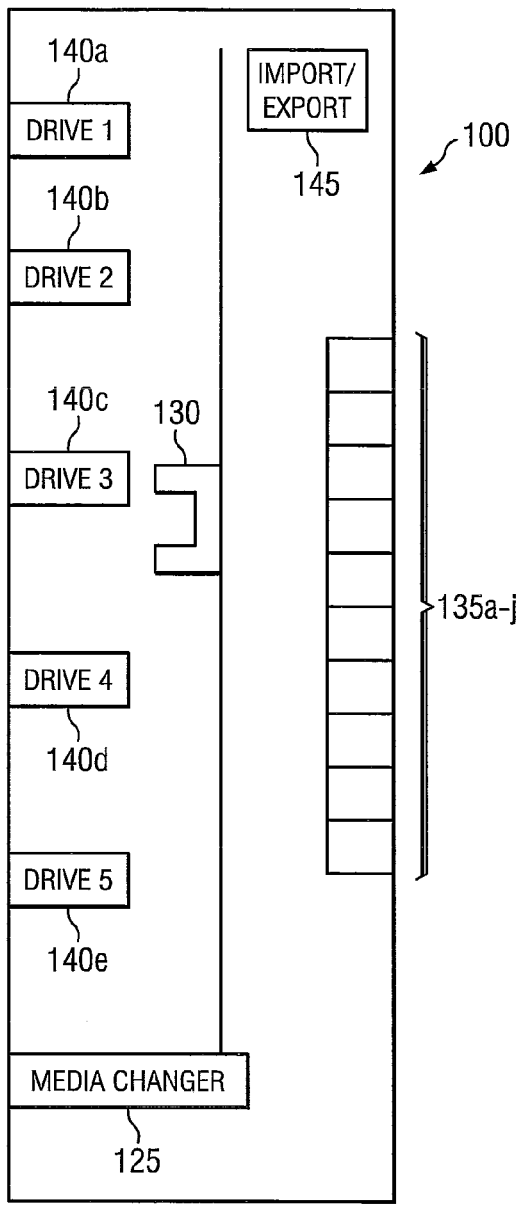
FIG. 1 is a diagrammatic representation of one embodiment of a library.

FIG. 1 is a diagrammatic representation of one embodiment of a tape library 100. Library 100 can comprise drives 140a-140e, media changer 125 and associated robot 130, import/export element(s) 145 and slots 135a-135j. It should be understood that the number of drives and slots or other library elements or components shown in library 100 are exemplary and library 100 may comprise any number of drives, slots or other elements or components as is necessary or desired. Drives 140a-140e can read/write data from/to magnetic tape (contained within cartridges), eject tape cartridges and perform other operations. Slots 135a-135j store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be read from the tape cartridge. It should be noted that some libraries may employ a single robot or multiple robots in an expandable or modular configuration.

In one embodiment, one or more of slots 135a-135j of library 100 are designated as secure slots and corresponding cartridges loaded into designated secure slots are secure cartridges. (Because that slot is designated as "secure.") In one embodiment, library 100 may be configured such that there is a one to one correspondence between slots and cartridges such that a particular slot has a corresponding cartridge and the corresponding cartridge is stored at the corresponding slot. Thus, a specific secure cartridge may uniquely correspond to a specific secure slot. Data sent over a network to be stored on a cartridge may be encrypted if the cartridge on which the data is to be stored is a secure cartridge, that is, if the slot corresponding to the cartridge is a secure slot. For example, a command may be sent to a library specifying a secure slot such that the (secure) cartridge stored at the secure slot is transferred to a drive and encrypted data is written to the secure cartridge. In a further embodiment, slots in a library may be partitioned into secure partitions and unsecure partitions such that a secure partition exists which contains secure slots and an unsecure partition exists which contains unsecure slots. In one embodiment, slots within a partition need not be contiguous. Accordingly, in one embodiment, a partition may comprise slots with disjoint or noncontiguous addresses. In a further embodiment, a library may be partitioned such that one or more partitions contain both secure and unsecure slots.

Figure 2:
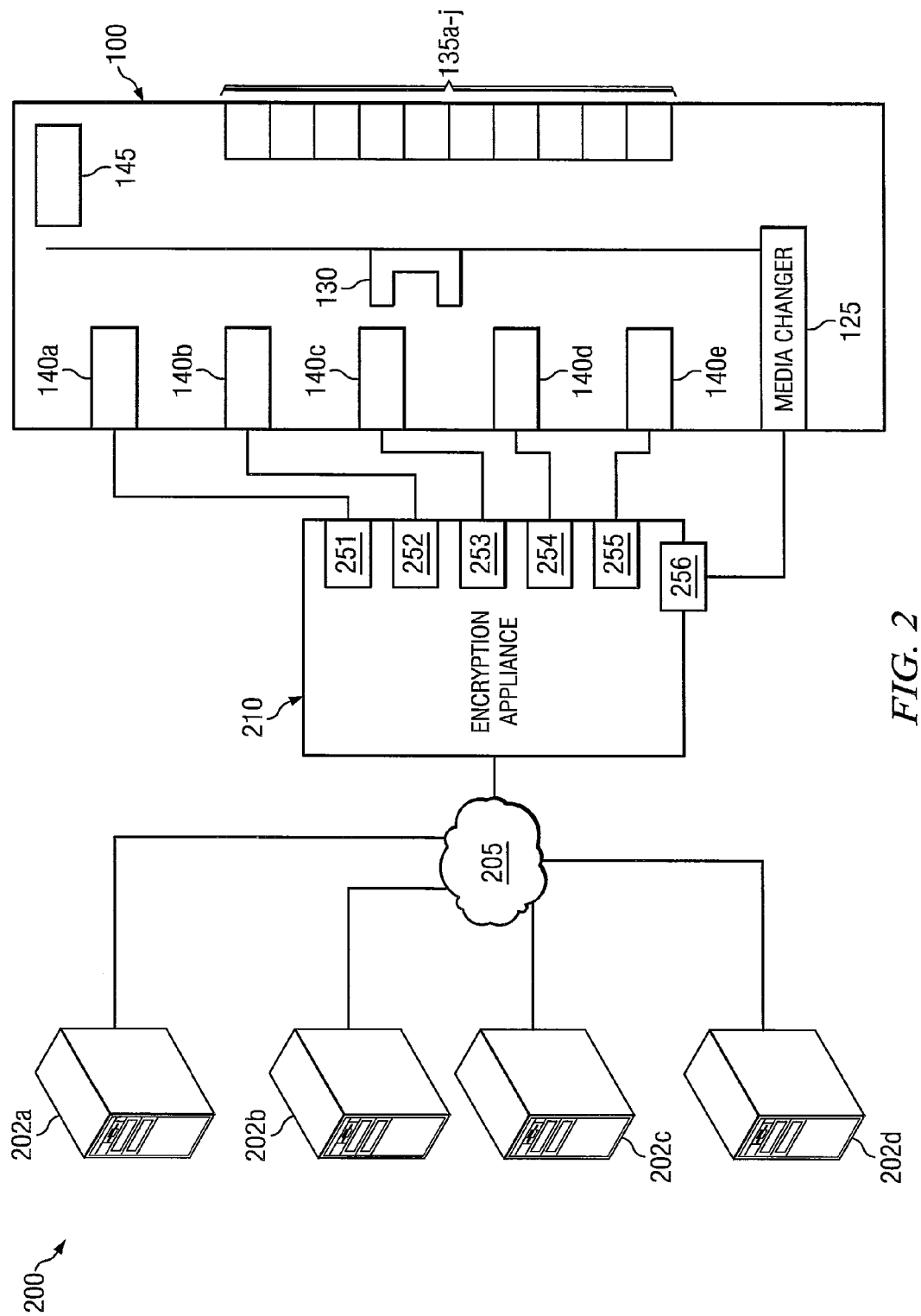
FIG. 2 is a diagrammatic representation of one embodiment of a network comprising an encryption appliance.

FIG. 2 is a diagrammatic representation of one embodiment of a system 200 in accordance with the invention in which a plurality of hosts 202a-202d have access to library 100 over network 205, where encryption appliance 210 connects both network 205 and library 100. Network 205 can comprise the Internet, a SAN, a LAN, a WAN, a wireless network or any other communications network for transferring data known in the art. Hosts 202a-202d are coupled to library 100 via network 205 through encryption appliance 210 and can communicate using FC, SCSI, iSCSI, TCP/IP, SATA or other protocols. Similarly, library 100 can communicate with network 205 over any suitable communications link or network known in the art and can use additional protocols such as FC, SCSI, iSCSI, TCP/IP, SATA or other protocol known in the art. As shown in the embodiment of FIG. 2, communications from hosts 202a-202d to library 100 and devices of library 100 and communications from library 100 and devices of library 100 to hosts 202a-202d via network 205 are intercepted by encryption appliance 210.

As depicted in the embodiment of FIG. 2, encryption appliance 210 is an in-line device upstream of library 100 operable to encrypt data sent over network 205 for storage on media of library 100. In particular, data destined for library 100 sent over network 205 may be intercepted by encryption appliance 210. Data to be sent to a particular drive may be encrypted and sent to the appropriate drive (for example, a drive of drives 140a-140e) through a corresponding port (for example, a port of ports 251-255) of encryption appliance 210. For example, data or data packets received at encryption appliance 210 may be transferred to the appropriate port based upon WWPN or WWNN identifying the destination drive in the data or data packets.

More specifically, library ports 251-256 may be individually connected to individual library components and individual library components may have an associated WWNN or WWPN which may be utilized to reference the associated component. Thus, library ports 251-256 may be associated with a particular WWNN or WWPN. For example, library port 251 is coupled to drive 140a, drive 140a may have or be associated with a WWNN or WWPN which may be unique relative to other library devices. Because library port 251 is coupled to drive 140*a*, library port 251 may be associated with the WWNN or WWPN of drive 140*a* such that commands or data sent out library port 251 may be received by drive 140*a*.

Because in system 200, encryption appliance 210 sits in-line between network 205 and media changer 125 of library 100 or is otherwise able to intercept or monitor commands from network 205 to media changer 125, encryption appliance 210 is able to intercept commands directing media changer 125 to move a (secure) cartridge from a secure slot to a drive. In one embodiment, encryption appliance 210 may contain a table listing element numbers of secure or unsecure slots of library 100: by parsing intercepted commands, an encryption device may detect that a cartridge has been or will be moved from a secure or unsecure slot to a specific drive based on the element number or other identification of the slot or the drive contained in the commands. Encryption appliance 210 may record that a secure cartridge is in a specific drive (for example, in one embodiment, the element number of the drive containing a secure cartridge may be noted). The table contained in encryption device 210 may further contain a list of the element numbers and corresponding WWNNs or WWPNs of drives such that the element number of the drive can be correlated to the WWNN or WWPN of that drive. When encryption appliance 210 receives data destined for the specific drive such as, for example, data addressed to the WWNN or WWPN of the specific drive, the encryption appliance 210 encrypts the data and sends the encrypted data to the drive, which writes the encrypted data to the cartridge. Subsequently, when encryption appliance 210 intercepts a command to media changer 125 of library 100 directing media changer 125 to move the cartridge in the specific drive back to the secure slot, encryption appliance 210 may stop encrypting data destined for the specific drive. The above-described process may be repeated for one or more secure cartridges in library 100. While the above process has been specifically described, this is by way of example, not limitation: other methods of encrypting data sent to secure cartridges may be used. For example, data sent to drives 140*a*-140*e* may usually be encrypted and the encryption may be turned off when an unsecure cartridge is loaded into a drive using a process similar to the above.

In an alternative embodiment, commands directed to a media changer may be monitored by an out-of-band device or appliance which may direct an encryption device to encrypt data destined for a particular drive in a library in response to detecting that a cartridge has been or will be moved to that particular drive from a secure slot.

Figure 3:
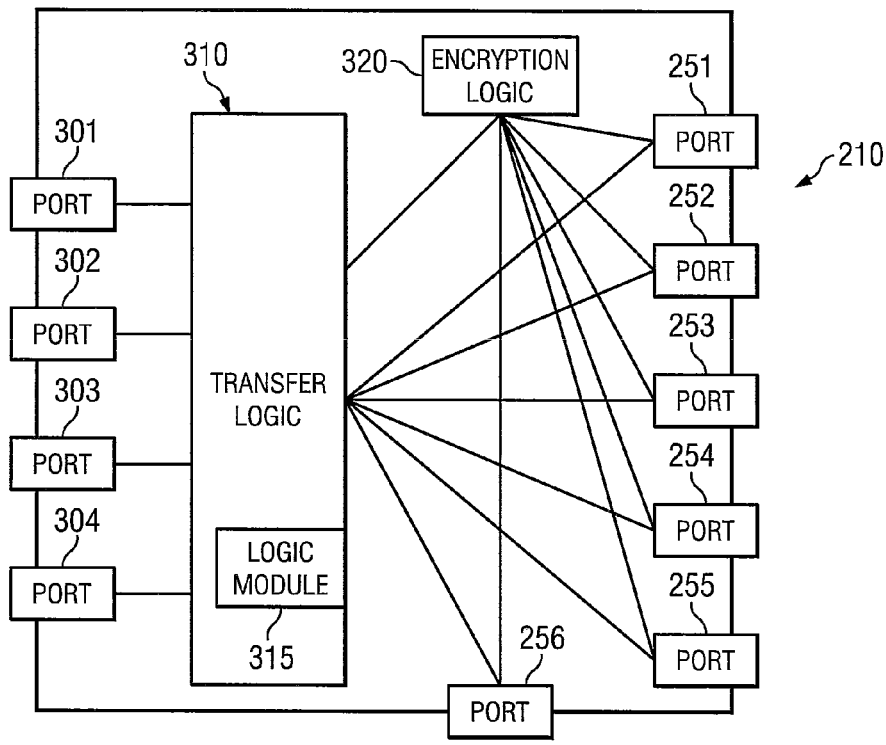
FIG. 3 is a diagrammatic representation of one embodiment of an encryption appliance.

FIG. 3 is a diagrammatic representation of one embodiment of encryption appliance 210 in accordance with one embodiment of the invention. Encryption appliance 210 may be an interface between a network and a library such as library 100 of FIG. 1. Encryption appliance 210 may comprise network ports 301-304, transfer logic 310, encryption logic 320 and library ports 251-256. Library ports 251-256 may be coupled to a library, more specifically library ports 251-256 may be coupled to library components which include drives or media changers. Network ports 301-304 may receive data from one or more networks. Data received at network ports 301-304 is passed to transfer logic 310 which identifies data to be encrypted. Data to be encrypted is forwarded to encryption logic 320 for encryption while data that will not be encrypted is passed to the appropriate library port for transmission to the appropriate drive at a library. Data transferred to encryption logic 320 is encrypted and passed to the appropriate library port for transmission to the appropriate drive. In one embodiment, encryption logic 320 may be implemented utilizing an encryption device such as a PCI card which may be utilized to encrypt data. An example of such a PCI card is the SafeXcel 182-PCI Card, by SafeNet Incorporated. In another embodiment, transfer logic 310 and encryption logic 320 may be implemented utilizing the same device or set of devices, for example, transfer logic 310 and encryption logic 320 may be implemented in firmware on a controller or by software executed by a processor.

More particularly, in one embodiment, commands to a media changer received at ports 301-304 may be intercepted and processed at logical module 315 within transfer logic 310. Logical module 315 may parse commands sent to a media changer of a library to determine media moved to a drive from a secure slot. Based on such a determination at logical module 315, transfer logic 310 may forward data to encryption logic 320 for encryption. While in FIG. 3, logical module 315 is shown as part of transfer logic 310, this is by way of example, not limitation and logical module 315 or the functionality of logical module 315 may be implemented at other locations within an encryption appliance or other device.

Figure 4:
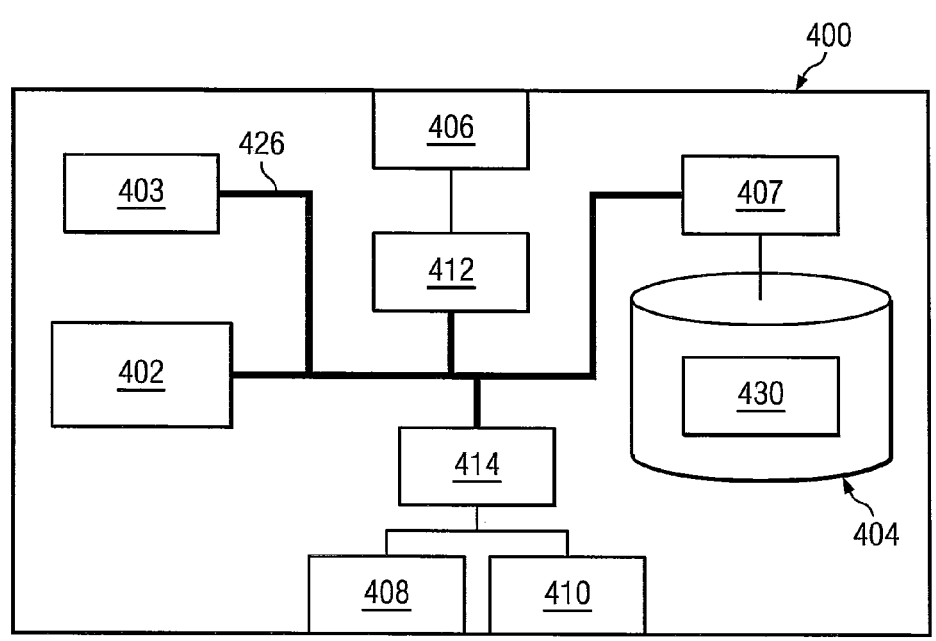
FIG. 4 is a diagrammatic representation of one embodiment of a controller which can be used in an encrypting appliance.

Turning now to FIG. 4, FIG. 4 is a diagrammatic representation of one embodiment of an encryption appliance controller 400 ("controller 400") which may be operable to store and execute software implementing transfer logic functionality or encryption logic functionality. For example, in one embodiment, controller 400 can implement logical module 315 of FIG. 3. Controller 400 can include a processor 402, such as an Intel Pentium 4 based processor (Intel and Pentium are trademarks of Intel Corporation of Santa Clara, Calif.), a primary memory 403 which, in one embodiment, may be RAM, ROM, Flash Memory, EEPROM or other computer readable medium known in the art and a secondary memory 404 which, in one embodiment, may be a hard drive, disk drive, optical drive or other computer readable medium known in the art. A memory controller 407 can control access to secondary memory 404. Controller 400 can comprise a communications interface 406 which, in one embodiment, may be a fibre channel interface, Ethernet port or other communications interface known in the art, to connect controller 400 to a network switch or other network interface. An I/O controller 412 can control interactions with the switch. Similarly, an I/O controller 414 can control interactions over I/O interfaces 408 and 410. Controller 400 can include a variety of input devices. Various components of controller 400 can be connected by a bus 426.

Secondary memory 404 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 404 can store a software program 430 that implements transfer logic functionality and may implement encryption logic functionality such that when executed, software program 430 may store encrypted data on secure cartridges, effecting secure slots or a secure library partition. Secondary memory 404 can also store an encryption policy which may be part of software program 430. During execution by processor 402, portions of program 430 can be stored in secondary memory 404 and/or primary memory 403.

Referring now to FIG. 3, in one embodiment of encryption appliance 210 of FIG. 3, each port may be associated with a World Wide Port Name ("WWPN") or a World Wide Node Name ("WWNN"). A WWPN or a WWNN may have one or more portions such as, for example, a Hi portion or a Lo portion which may be used to uniquely identify devices in a network or in library. Thus, encryption appliance 210 may utilize a portion of a WWPN or WWNN to determine the destination at a library of encrypted or unencrypted data. For example, a drive in a library may have a WWPN or a WWNN and may be coupled to port 251 of encryption appliance 210. Thus, port 251 may be associated with the WWPN or the WWNN of a particular drive such that when data is intercepted by encrypting appliance 210 which is destined for that particular drive, encrypting appliance may transmit data (either encrypted or unencrypted) to the drive by sending the data to the library via port 251.

In one embodiment of an encryption system and method according to the invention, encryption is turned on or off according to one or more encryption policies. Encryption policies may specify, for example, secure or unsecure slots or data to be encrypted. Encryption policies may be contained at encryption appliance 210 or may be contained at one or more hosts in a network. In one embodiment, in the context of encryption appliance 210, a set of encryption policies may be stored in a memory at encryption appliance 210 which may be part of transfer logic 310. Transfer logic 310 may have logic to implement the policies, for example, logical module 315. In one embodiment, one or more encryption policies may be utilized by transfer logic 310 to turn on or off encryption such that secure cartridges in the library contain encrypted data and unsecure cartridges in the library contain unencrypted data. An encryption policy may also specify one or more secure or unsecure library partitions.

One embodiment of an encryption policy comprises a table which may be, in one embodiment, a lookup table or list which may contain the element numbers of secure slots. Commands received from a network may be analyzed by transfer logic 310 utilizing the table of the encryption policy to determine if data received from the network is destined for a secure slot (and is thus to be stored on a secure cartridge). For example, commands received over a network may specify the element number of the slot corresponding to the cartridge on which data is to be stored. More specifically, a command containing a specific element number specifying a specific slot may be sent over a network to a media changer of a library which causes the media changer to move a secure cartridge from a secure slot to a specific drive. Subsequently, data may be directed to the specific drive containing the secure cartridge. Based on the table, which lists the elements numbers or other identification identifying secure slots, data destined for the secure cartridge may be forwarded to encryption logic 320 such that the data is encrypted before it is sent to the secure cartridge.

Thus, in one embodiment, a command to a media changer of a library may instruct the media changer to move a cartridge stored at a slot referenced by a corresponding element number to a drive referenced by a corresponding element number. This command may be intercepted by transfer logic 310 and parsed by logical module 315 based upon an encryption policy listing element numbers of secure slots to determine that the cartridge is a secure cartridge stored at a secure slot. The element number of the drive holding the secure cartridge may be correlated with the WWNN or WWPN of the drive. Such correlation(s) may be based on a list of drive element numbers and corresponding WWNNs or WWPNs, which may, for example, be part of the encryption policy, such that data directed to the WWNN or WWPN of a drive with a secure cartridge from a secure slot may be forwarded to encryption logic 320 for encryption before the data is sent to the drive.

It should be noted that because embodiments of compressible data may not be compressible after encryption, encryption appliance 210 may have the capability to compress data before the data is encrypted. For example, in one embodiment, if transfer logic 310 determines that compressible data is to be sent to a secure cartridge, before encryption at encryption logic 320, the data is compressed. Subsequent to compression, the data is encrypted at encryption logic 320.

Data passed to encryption logic 320 may contain various layers and sections. For example, a packet forwarded to encryption logic 320 for encryption may contain a header which allows the packet to be forwarded through one or more portions or sections of a network and a data section which contains data sent from a host to be stored at a library. In one embodiment, encryption logic 320 will encrypt the data section of a packet and will not encrypt the header or other sections of a packet which contain information regarding the destination of the packet.

Figure 5:
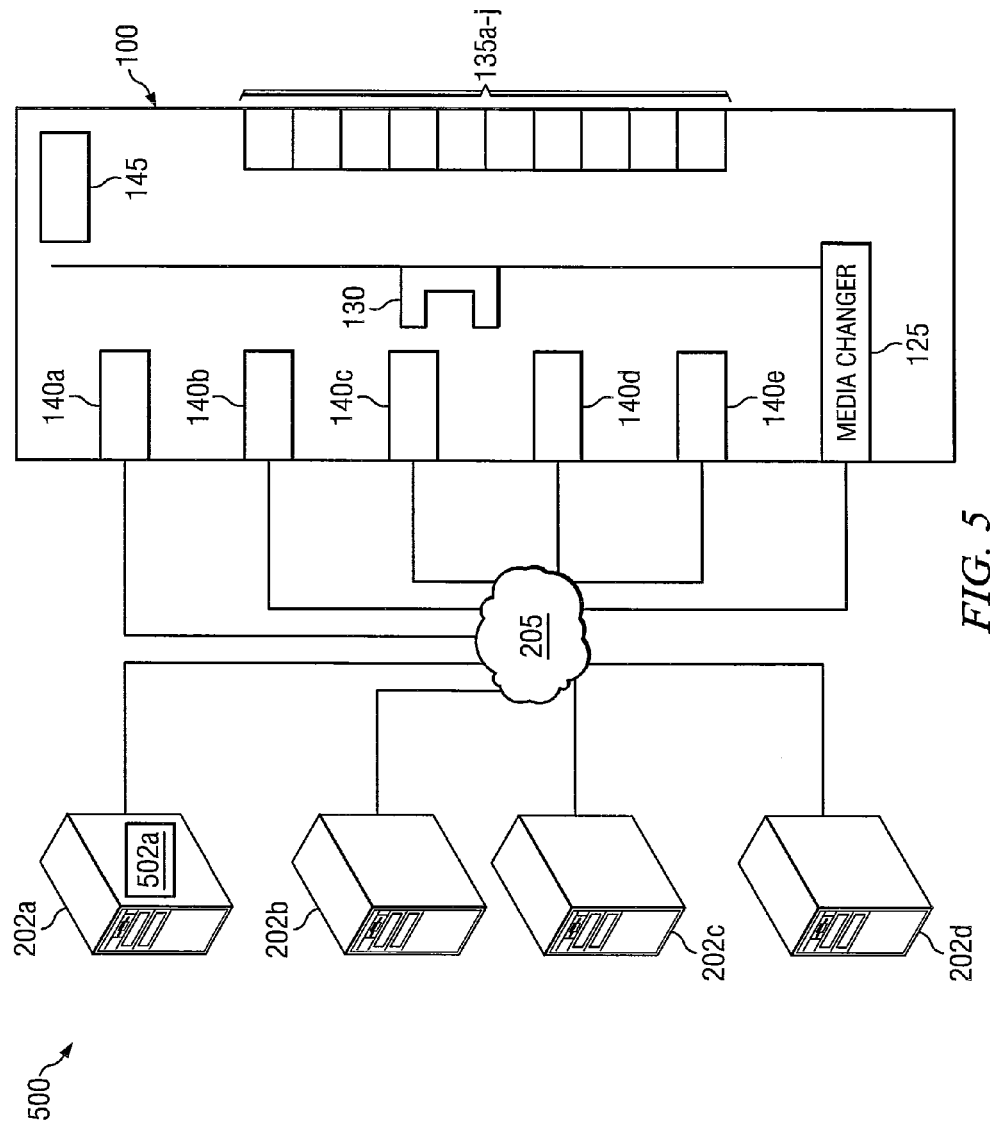
FIG. 5 is a diagrammatic representation of one embodiment of a network.

Turning now to FIG. 5, FIG. 5 is a diagrammatic representation of an embodiment of a system 500 operable to store encrypted data on secure cartridges. Rather than encryption appliance 210, which is a physical device, being utilized to enable the encryption of data sent to drives for storage on one or more secure cartridges, in system 500 of FIG. 5 encryption functionality is implemented at drives 140a-140e of library 100 and functionality of transfer logic 310 and encryption logic 320 of FIG. 3 is implemented at hosts 202a-202d. More particularly, as shown in FIG. 5, drives 140a-140e may be encrypting drives operable to encrypt data sent to them and operable to store the encrypted data on one or more cartridges. In addition, software, such as, for example, storage or backup software, may be executed by hosts 202a-202d to determine if a drive being sent data should encrypt data stored on a cartridge. Such software or portions thereof may reside at each of hosts 202a-202d.

For example, host 202a of FIG. 5 may contain a storage program 502a which in turn may contain an encryption policy designating specific slots as secure slots storing secure cartridges. Based on the encryption policy, when host 202a sends a command to media changer 125 which results in a (secure) cartridge from a secure slot being loaded into a specific drive, (for example, into drive 140c) host 202a sends a command over network 205 to the specific drive, instructing the drive to enable encryption. Subsequent data sent to the drive over network 205 will be encrypted by the drive before the data is stored on the secure cartridge.

In yet another embodiment, referring to FIG. 5, instead of encryption functionality being implemented at drives 140a-140e, encryption functionality may be implemented at hosts 202a-202d. For example, hosts 202a-202d may contain an encryption program executable to encrypt data sent to a library for storage and a storage program which may contain an encryption policy designating specific slots as secure slots storing secure cartridges. Based on the encryption policy, host 202a may send a command to media changer 125 which results in a (secure) cartridge from a secure slot being loaded into a specific drive, (for example, into drive 140c) and host 202a encrypts data sent over network 205 to the specific drive which in turn stores the encrypted data on the secure cartridge.

In the system depicted by FIG. 5, storing encryption policies at one or more hosts may result in different hosts adhering to different encryption policies because the encryption policies held at each host may be changed or modified over time. The use of different encryption policies with multiple hosts may result in different hosts treating different slots and corresponding cartridges as secure or unsecure slots or cartridges, resulting in cartridges storing both secure and unsecure data. In one embodiment, system 500 of FIG. 5 can ensure that secure slots and cartridges and unsecure slots and cartridges are maintained in a set or partition which is the set or partition for all hosts by synchronizing encryption policies between hosts such that changes across encryption policies stored at multiple hosts are consistent. In another embodiment, the same encryption policy may be used by multiple hosts and stored at a location which can be accessed by the multiple hosts. It should be noted that while the above methodologies have been described with regard to hosts, one or more of the hosts may be servers or the above methodologies may be implemented by servers in a network coupled to a library.

While shown as a physical media library in FIGS. 2 and 5, library 100 of FIGS. 2 and 5 can be a virtual media library, that is, a virtual representation of one or more physical media libraries as presented by a network switch, a library controller or other component. Examples of library virtualization are described in U.S. patent application Ser. No. 10/704,265, entitled SYSTEM AND METHOD FOR CONTROLLING ACCESS TO MULTIPLE PHYSICAL MEDIA LIBRARIES, and U.S. patent application Ser. No. 10/703,965, entitled SYSTEM AND METHOD FOR CONTROLLING ACCESS TO MEDIA LIBRARIES, both of which are hereby incorporated by reference herein.

Figure 6:
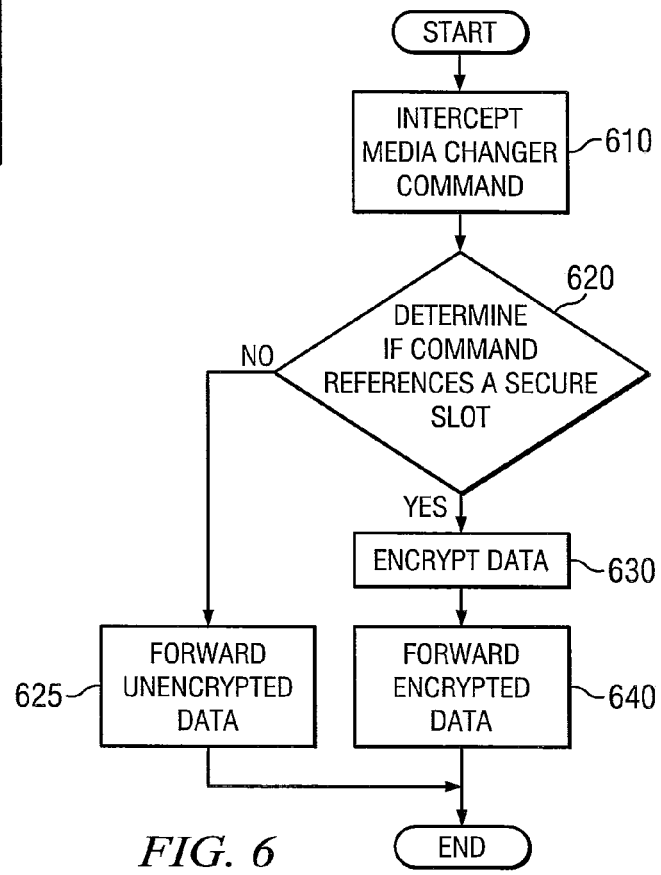
FIG. 6 is a flowchart illustrating a method for monitoring library components according to one embodiment.

FIG. 6 is a flow chart illustrating one embodiment of a method for enabling encryption based on slots which are secure or unsecure. According to one embodiment, the method of FIG. 6 can be implemented as a set of computer executable instructions stored on a computer readable medium at, for example, encryption appliance 210 of FIG. 2. The set of computer executable instructions can, when executed, store encrypted data on secure cartridges and may implement an encryption policy specifying secure slots. At step 610, a command to the media changer of a library is intercepted. The command may specify a slot containing a cartridge. At step 620, it is determined if the command references a secure slot in a library or a secure slot in a secure library partition. More particularly, it is determined if the command specifies that the media changer move a cartridge from a secure slot to a drive. If the command does not specify that the media changer is to move a cartridge from a secure slot or partition to a drive, then, at step 625, when data is sent to the drive containing the cartridge, the data is not encrypted before being sent to the drive. If the command specifies that the media changer is to move a cartridge from a secure slot or partition to a drive, then, at step 630, data to be sent to the drive is encrypted. Subsequent to encryption, at step 640, encrypted data is sent to the drive. In order to determine whether the slots are secure or unsecure slots, an encryption policy listing secure slots may be utilized. The encryption policy may list the secure slots by element number. A further list, which may be part of the encryption policy, may list element addresses of drives and a corresponding WWNN or WWPN such that when a cartridge or other media is moved to a drive, the drive can be identified and correlated with a network address, allowing encrypted data to be sent to the drive or commands turning on encryption at the drive to be sent to the drive.

Embodiments can also be implemented with respect to libraries of media other than magnetic tapes such as any media used in a library having drives, slots and media or equivalents. For example, the library can comprise a plurality of optical disks (i.e., an optical jukebox) stored at slots and accessed by one or more drives and these slots may be designated as secure or unsecure and may be part of a secure library partition. Other libraries which may contain secure media according to embodiments of above described systems and methods can utilize a combination of different storage media such as hard drives, magnetic media or optical media.

While embodiments have been described with particularity, it should be understood that the embodiments are illustrative and that the scope of the invention is not limited to these embodiments. Many other variations, modifications, additions and improvements to the embodiments described above are possible. It is contemplated that these variations, modifications, additions and improvements fall within the scope of the invention as detailed in the following claims.

What is claimed is:

1. A system for encrypting data stored on media in a media library, comprising:
   one or more hosts coupled to a network and operable to send one or more commands over the network;
   a media library coupled to the network and comprising:
      a plurality of slots, wherein the plurality of slots include one or more secure slots;
      a look-up-table listing identifiers for each of the one or more secure slots;
      one or more drives coupled to the network and operable to receive data over the network;
      one or more media stored at corresponding slots of the plurality of slots; and
      a media changer coupled to the network and operable to receive the one or more commands over the network and move media between the plurality of slots and the one or more drives in accordance with the one or more commands;
      transfer logic operable to intercept the one or more commands to the media changer and parse the one or more commands to determine media moved to a drive from a secure slot by the media changer, wherein the determination is made by accessing one or more encryption policies listing the one or more secure slots of the plurality of slots as secure and an identifier for the secure slot; and
      encryption logic operable to encrypt data sent to the drive containing media from the secure slot in response to a determination that the media has been moved to the drive from the secure slot.

2. The system of claim 1, wherein the media are tape cartridges.

3. The system of claim 1, further comprising an encryption appliance, the encryption appliance containing the transfer logic or the encryption logic.

4. The system of claim 1, wherein the transfer logic is located at a host of the one or more hosts.

5. The system of claim 1, wherein the encryption logic is located at a host of the one or more hosts.

6. The system of claim 1, wherein the encryption logic is located at a drive of the one or more drives.

7. The system of claim 1, further comprising an encryption policy, wherein the encryption policy specifies the one or more secure slots.

8. The system of claim 1, further comprising a partition, wherein the partition comprises the one or more secure slots.

9. The system of claim 1, further comprising a partition, wherein the partition comprises one or more slots, at least one of the one or more slots of the partition being one of the one or more secure slots.

10. A method for encrypting data stored on media in a media library, comprising:
  intercepting one or more commands sent over a network to a media library, the media library comprising:
    a plurality of slots, wherein the plurality of slots include one or more secure slots;
    a look-up-table listing identifiers for each of the one or more secure slots;
    one or more drives;
    one or more media stored at corresponding slots of the plurality of slots; and
    a media changer operable to move media between the plurality of slots and the one or more drives in accordance with the one or more commands;
  parsing the one or more commands to determine a first media moved to a drive from a secure slot, wherein the determination is made by accessing one or more encryption policies listing the one or more secure slots of the plurality of slots as secure and an identifier for the secure slot; and
  encrypting data to be stored on the first media from the secure slot in response to a determination that the first media has been moved to the drive from the secure slot.

11. The method of claim 10, wherein the one or more media are tape cartridges.

12. The method of claim 10, further comprising determining the drive containing the first media.

13. The method of claim 10, further comprising designating one or more slots of the one or more secure slots in accordance with an encryption policy.

14. The method of claim 13, wherein the encryption policy comprises a list of the one or more secure slots and the corresponding identifiers.

15. A non-transitory computer readable medium comprising computer instructions, the computer instructions executable by a computer processor to:
  intercept one or more commands sent over a network to a media changer of a media library coupled to the network comprising a plurality of slots including one or more secure slots, a look-up-table listing identifiers for each of the one or more secure slots, and one or more drives coupled to the network operable to receive data over the network, one or more media stored at corresponding slots of the plurality of slots, a media changer coupled to the network and operable to move media between the plurality of slots and the one or more drives in accordance with the one or more commands;
  parse the one or more commands to determine a media moved to a drive from a secure slot, wherein the determination is made by accessing one or more encryption policies listing the one or more secure slots of the plurality of slots as secure and an identifier for the secure slot; and
  encrypt data to be stored on the media from the secure slot in response to a determination that the media has been moved to the drive from the secure slot.

16. The computer readable medium of claim 15, wherein the media is a tape cartridge.

17. The computer readable medium of claim 15, further comprising determining the drive containing the media.

18. The computer readable medium of claim 15, further comprising designating one or more slots of the plurality of slots as the one or more secure slots in accordance with an encryption policy.

19. The computer readable medium of claim 18, wherein the encryption policy comprises a list of the one or more secure slots and the corresponding identifier.

20. An encryption appliance operable to encrypt data, the encryption appliance comprising:
  a processor;
  a media library coupled to a network and comprising a plurality of slots including one or more secure slots, a look-up-table listing identifiers for each of the one or more secure slots, and one or more drives coupled to the network operable to receive data over the network one or more media stored at corresponding slots of the plurality of slots, a media changer coupled to the network and operable to move media between the plurality of slots and the one or more drives in accordance with the one or more commands; and
  a non-transitory computer readable medium comprising instructions for implementing:
    transfer logic operable to intercept the one or more commands to the media changer over the network and parse the one or more commands to determine media moved to a drive from a secure slot by the media changer, wherein the determination is made based on the look-up-table listing an identifier of the secure slot and accessing one or more encryption policies listing the secure slot as secure; and
    encryption logic operable to encrypt data sent to the drive containing media from the secure slot in response to a determination that the media has been moved to the drive from the secure slot.

21. The encryption appliance of claim 20, wherein the media are tape cartridges.

22. The encryption appliance of claim 20, wherein the encryption appliance further comprises a logical partition having the one or more secure slots.

* * * * *